US005529277A

United States Patent [19]

Ostaszewski

[11] Patent Number: 5,529,277

[45] Date of Patent: Jun. 25, 1996

[54] SUSPENSION SYSTEM HAVING TWO DEGREES OF ROTATIONAL FREEDOM

[75] Inventor: Miroslaw A. Ostaszewski, Louisville, Colo.

[73] Assignee: Ball Corporation, Muncie, Ind.

[21] Appl. No.: 309,039

[22] Filed: Sep. 20, 1994

[51] Int. Cl.[6] .................................................... F16M 13/00

[52] U.S. Cl. .......................... 248/603; 248/398; 248/604; 248/618; 248/629; 267/158; 267/160; 359/223

[58] Field of Search .................................... 248/133, 138, 248/398, 474, 603, 604, 618, 629; 267/158, 160; 359/223, 224

[56] References Cited

U.S. PATENT DOCUMENTS

| | | | |
|---|---|---|---|
| 854,426 | 5/1907 | Lowry . | |
| 1,013,786 | 1/1912 | Lambert . | |
| 1,334,557 | 3/1920 | Ruff . | |
| 1,602,912 | 10/1926 | Leipert . | |
| 1,952,970 | 3/1934 | Brofelth | 64/96 |
| 2,484,823 | 10/1949 | Hammond, Jr. | 74/5.4 |
| 3,060,334 | 10/1962 | Favre | 310/38 |
| 3,156,759 | 11/1964 | Collen | 88/97 |
| 3,181,851 | 5/1965 | Troeger | 267/1 |
| 3,181,918 | 5/1965 | Troeger | 308/2 |
| 3,188,071 | 6/1965 | Owen | 267/1 |
| 3,246,890 | 4/1966 | Ormond | 267/1 |
| 3,469,417 | 9/1969 | Wakelin | 64/12 |
| 3,592,422 | 7/1971 | Norman | 248/604 |
| 3,743,268 | 7/1973 | Heiland et al. | 267/160 |
| 3,909,077 | 9/1975 | Leonarduzzi | 308/2 R |
| 3,981,566 | 9/1976 | Frank et al. | 359/224 |
| 3,998,092 | 12/1976 | Maccabee | 73/71.3 |
| 4,025,203 | 5/1977 | Lee | 350/285 |
| 4,060,315 | 11/1977 | Heinz | 350/289 |
| 4,230,291 | 10/1980 | Marshall II | 248/618 |
| 4,261,211 | 4/1981 | Haberland | 267/160 |
| 4,382,709 | 5/1983 | Brown | 308/2 A |
| 4,460,252 | 7/1984 | Volleau et al. | 350/486 |
| 4,497,465 | 2/1985 | Yeakley et al. | 267/160 |
| 4,511,115 | 4/1985 | Ludwigsen | 248/603 |
| 4,538,882 | 9/1985 | Tanaka et al. | 267/160 |
| 4,732,440 | 3/1988 | Gadhok | 350/6.6 |
| 4,802,720 | 2/1989 | Paulsen | 359/224 |
| 4,802,784 | 2/1989 | Brooks | 403/24 |
| 4,861,125 | 8/1989 | Vaught | 359/224 |
| 4,973,145 | 11/1990 | Kirkwood et al. | 350/632 |
| 5,110,195 | 5/1992 | Loney | 359/224 |
| 5,267,720 | 12/1993 | Brazell et al. | 248/618 |
| 5,315,890 | 5/1994 | Long | 267/160 |

FOREIGN PATENT DOCUMENTS

| | | | |
|---|---|---|---|
| 1590759 | 9/1990 | U.S.S.R. | 267/158 |

*Primary Examiner*—Leslie A. Braun
*Assistant Examiner*—Richard M. Smith
*Attorney, Agent, or Firm*—Duft, Graziano & Forest

[57] ABSTRACT

A system is described which utilizes two perpendicular four-bar linkages coupled by a common plate to provide a translational-free flexible suspension having two rotational degrees of freedom about a desired point. One of the four-bar linkages is secured to a stationary "ground" structure, and the other linkage is attached to the object to be supported, such as a mirror. In one embodiment, two links of each of the two four-bar linkages are constructed from spring steel flexure elements which are rigid in all directions except about the rotational axis. The flexure elements thus comprise "revolute joints". Because the flexure elements function as spring hinges, no friction is encountered when the suspension is displaced or "pivoted".

9 Claims, 3 Drawing Sheets

SUSPENSION SYSTEM HAVING TWO DEGREES OF ROTATIONAL FREEDOM

FIELD OF THE INVENTION

This invention relates to suspension systems for supporting objects, and more particularly, to a flexible suspension system for supporting an object to be rotated or oscillated about two perpendicular axes while restricting translational movement of the supported object.

PROBLEM

It is a problem in the area of suspension systems to provide a flexible support structure having two degrees of freedom of rotation about a desired point while minimizing any translational movement of the object being supported. Optical scanning systems are a typical example of a type of system which requires a flexible suspension system having a high scanning frequency. In scanning systems which use a mirror to rapidly scan back and forth across a small angular excursion, suspension component friction must be kept to a minimum in order to permit a high scanning frequency. It is also desirable to provide rotational freedom about two orthogonal axes while minimizing translational movement of the mirror or other supported object. Prior suspension systems satisfy one or more of these requirements, but no prior system provides all of the features of the present system.

SOLUTION

The above problems are solved and a technical advance made in the field by the flexure suspension system of the present invention. The present system utilizes two perpendicular four-bar linkages coupled by a common plate to provide a translational-free flexible suspension having two rotational degrees of freedom about a desired point. One link of the four-bar linkages is secured to a stationary "ground" structure, and the other link is attached to a frame or other object to be supported, such as a mirror. In one embodiment of the present system, two links of each of the two four-bar linkages are constructed from spring steel flexure elements which are rigid in all directions. The end of each link comprises a pivotable joint which is rigid in all directions except about the rotational axis. These pivotable joints thus comprise "revolute joints".

The pivotable joints function as spring hinges, and therefore no friction is encountered when the suspension is displaced or "pivoted". The resistance encountered in inducing rotatation of each flexure element provides a force which tends to cause the flexure element to return to its pre-rotated position. This characteristic together with the lack of rotational friction allows the suspension system to achieve high pivotal frequencies. The present system can also employ pivotable joints having bearings, hinges, or any other devices which function as revolute joints.

BRIEF DESCRIPTION OF THE DRAWING

The present invention can be better understood from a reading of the following description thereof taken in conjunction with the drawing in which.

DETAILED DESCRIPTION

Four Bar Linkage

Figure 1:
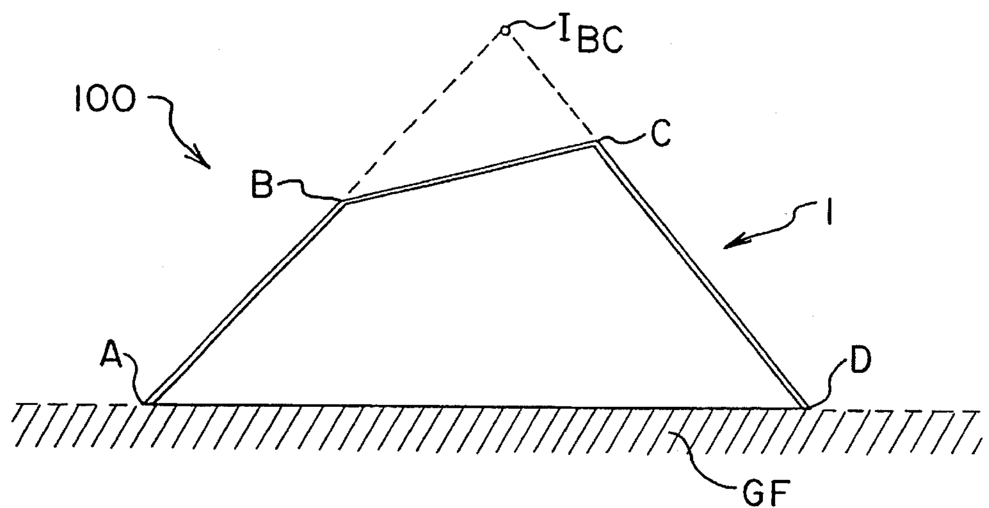
FIG. 1 illustrates a single four-bar linkage, which is well-known.

FIG. 1 illustrates a single four-bar linkage 100, which is well-known in the art. In its simplest form, a four-bar linkage consists of connected series of four pivotably-interconnected rigid bodies. As shown in FIG. 1, four-bar linkage 1 consists of four connected links AB, BC, CD, and AD. In the configuration of FIG. 1, link AD is either fixed to a stationary ground frame GF, or constitutes the ground frame itself. Links AB, BC, and CD pivot at each end thereof about a rotational axis orthogonal to the plane defined by any two adjacent links. This type of linkage allows link AB to pivot about point A, links AB and BC to pivot about point B, links BC and CD pivot about point C, and link CD to pivot about point D. Each pivotal connection constitutes a "revolute joint", which is stiff in all directions except about the axis of rotation. When link BC is forced to move, it rotates about point $I_{BC}$, which is the instantaneous point of rotation. Point $I_{BC}$ is determined by the intersection of lines AB and CD. This system of rigid links ABCD, connected by revolute joints is constrained to move in a single plane ABCD only.

Description of an Exemplary Embodiment

Figure 2:
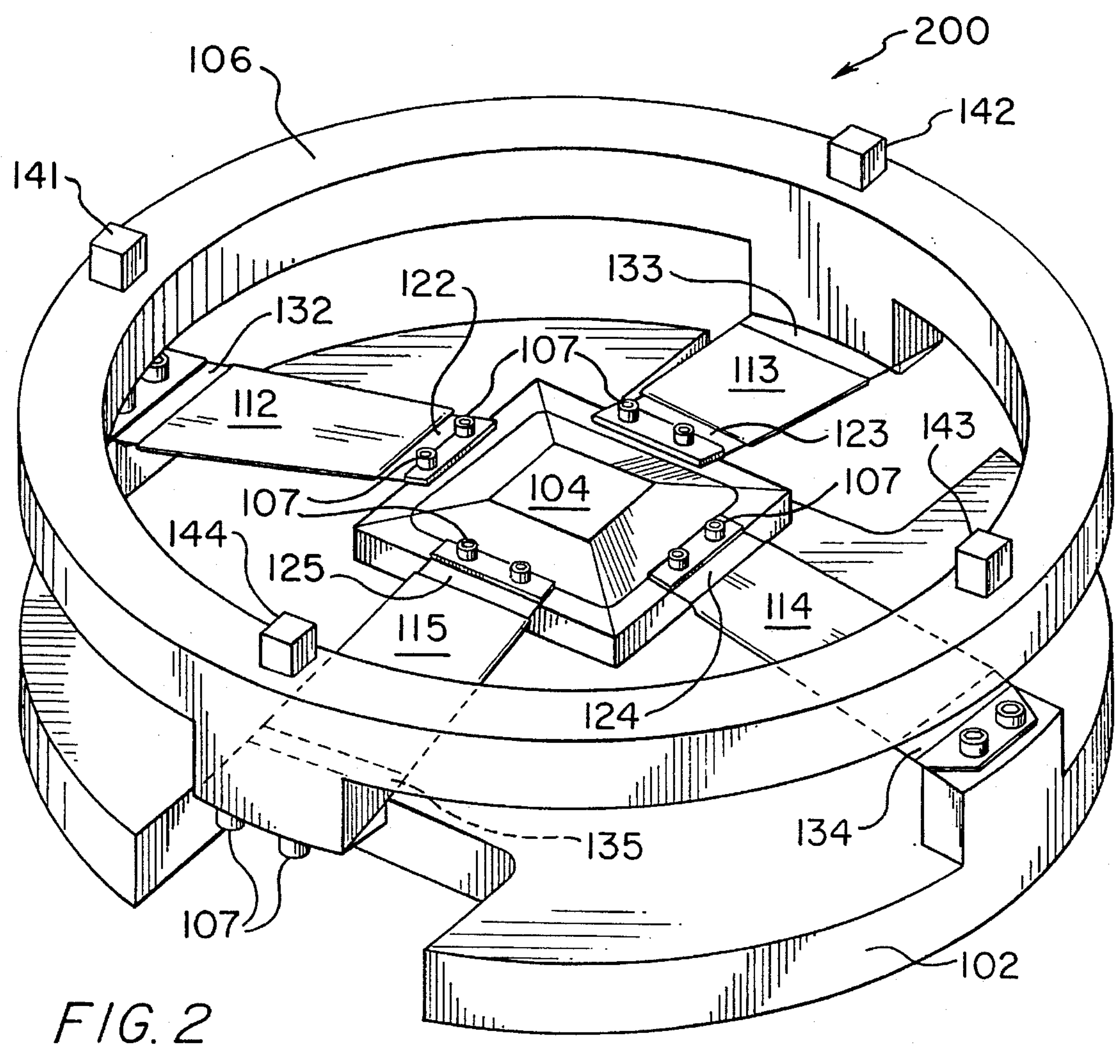
FIG. 2 is a perspective view of one embodiment of the suspension system of the present invention.
Figure 3:
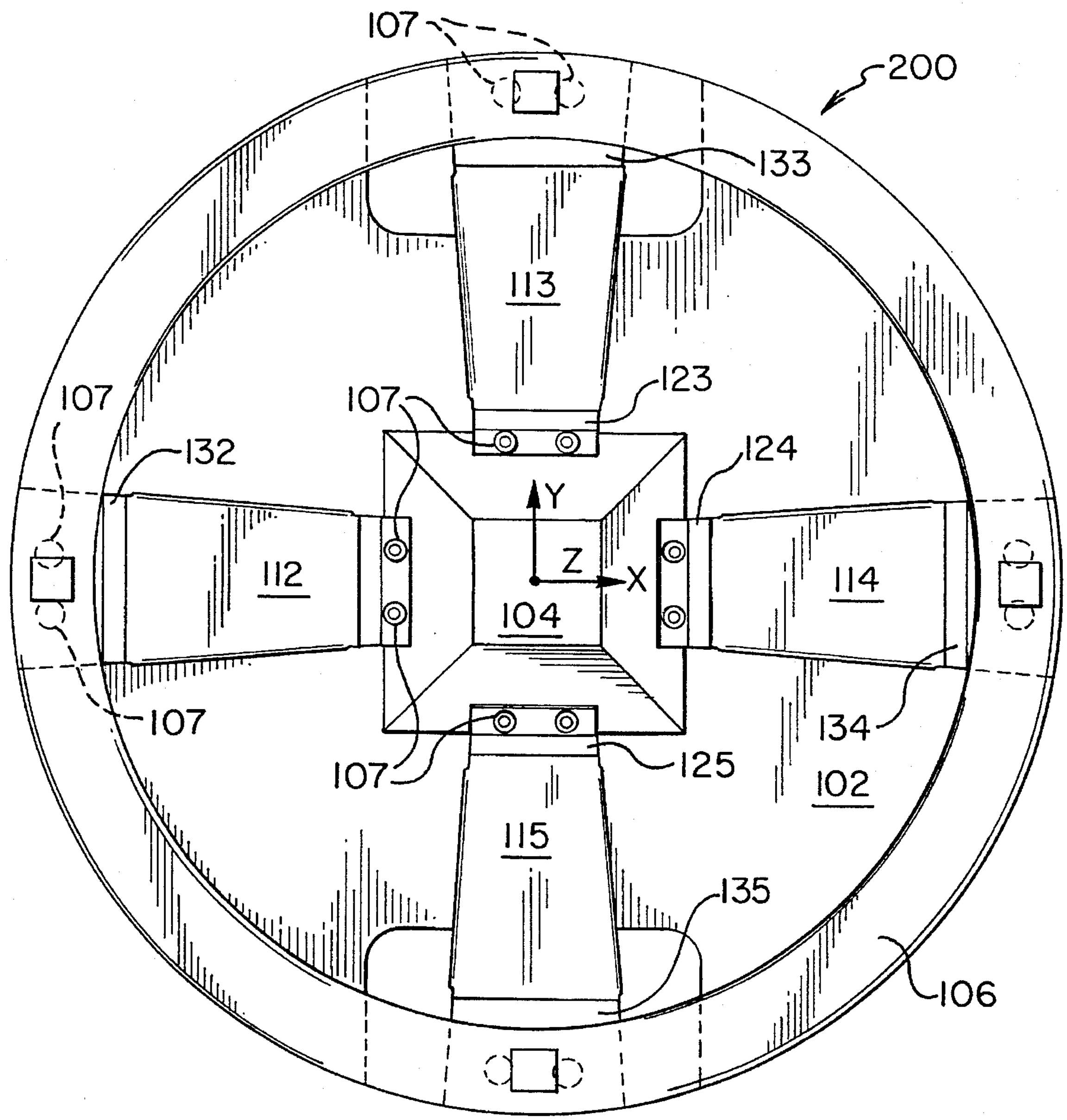
FIGS. 3–5 are a top view and two side views, respectively, of the embodiment shown in FIG. 2.
Figure 4:
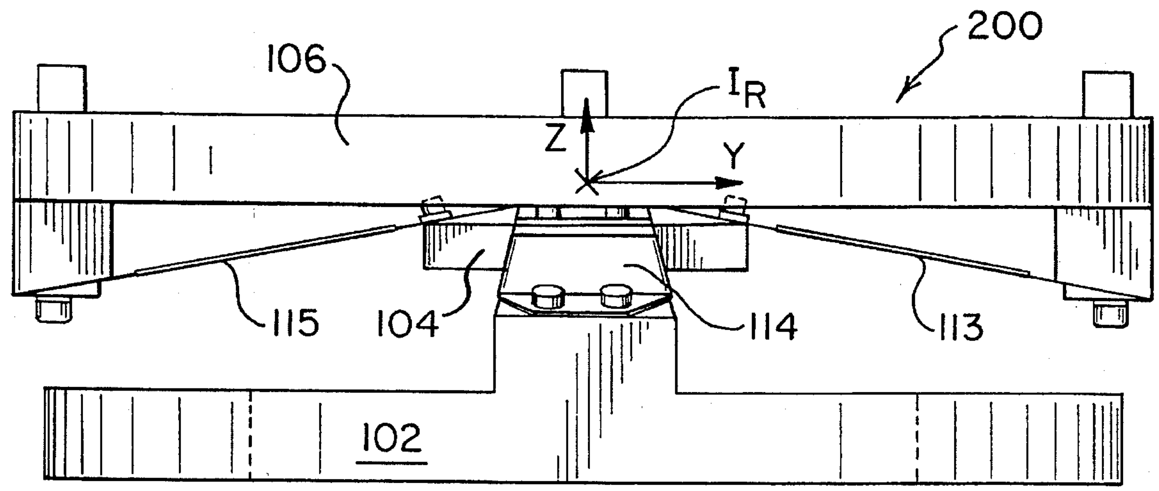
Figure 5:
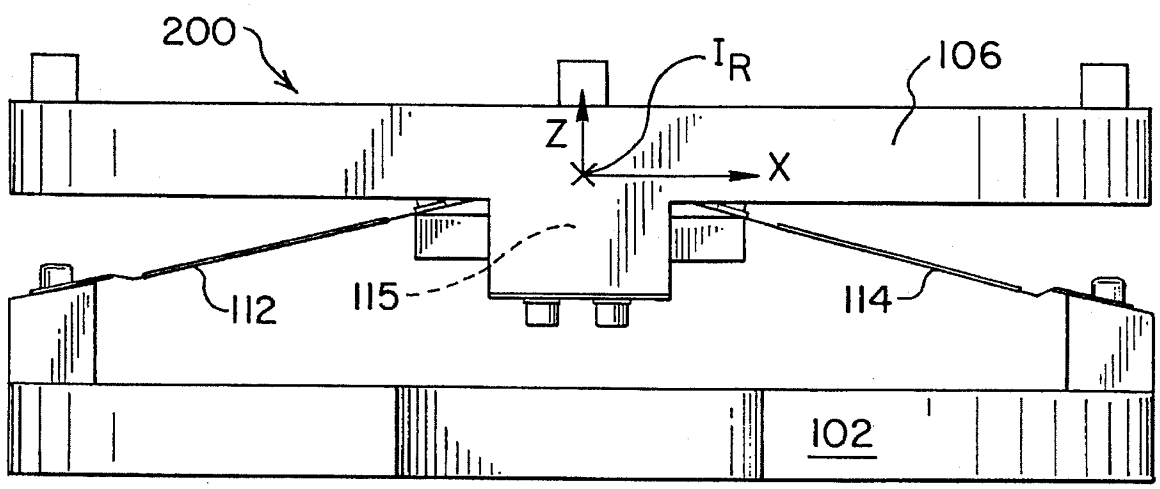

FIG. 2 is a perspective view of an exemplary embodiment of the suspension system 200 of the present invention, and FIGS. 3–5 are a top and two side views of the embodiment of suspension system 200 shown in FIG. 2. As shown in FIGS. 2–5, one end of each flexure element 113 and 115 is attached to support frame 106, and one end of each flexure element 112 and 114 is attached to ground frame 102. The opposite ends of both sets of flexure elements 113/115 and 112/114 are attached to coupling plate 104. Flexure elements 112–115 can be attached to support frame and/or ground frame and coupling plate via bolts 107 and/or epoxy, or by other suitable fastening means.

In one exemplary embodiment, flexure elements 112–115 comprise thin sheet spring steel which is approximately 0.05 inches in thickness and which tapers from approximately 1 inch to 0.8 inches in width. In this embodiment, each end section ("pivotable member") 122–125, 132–135 of flexure elements 112–115 is significantly thinner (e.g., 0.005 inches) than the intermediate body of the flexure element. These end sections, or "pivotable members" 122–125, and 132–135 function as "revolute joints" since they are rigid in all directions except in the direction about their rotational axis, which is orthogonal to the plane defined by the longitudinal axes of each pair of flexure elements 112/114 and 113/115.

The dimensions of the flexure elements are not critical, and these dimensions may vary as a function of the weight to be supported as well as the vibrational frequency and resonance requirements of the suspension. The material from which the flexure elements are constructed is also not critical, as long as the flexure elements are relatively rigid. It should also be noted that the revolute joints at each end of the flexure elements can also comprise hinges, with or without bearings, or any other devices which function as revolute joints.

In an alternative embodiment, flexure elements 112/114 and 113/115 include end sections 122–125, and 132–135 which are the same thickness as the intermediate flexure element sections 112/114 and 113/115. In a further alternative embodiment, end sections 122–125 are non-existent. In either of these alternative embodiments, flexure elements

112/114 and 113/115 are flexible in directions both toward and away from ground frame 102, i.e., in the same direction as if revolute joints were present at each end thereof.

Flexure element pairs 112/114 and 113/115 are positioned at right angles to each other and thus comprise two perpendicular four-bar linkages: 102/112/104/114/102 and 106/113/104/115/106 which are coupled by common plate 104 to provide a flexible suspension having two rotational degrees of freedom. The two coupled four-bar linkages of the present invention allow a point of rotation to be situated at any desired point. In addition, the support frame 106 does not exhibit translational movement in any direction, or rotation about an axis normal to a perimeter of a plane defined by a perimeter of the support frame. As best seen from FIGS. 4 and 5, the point of rotation, or more specifically, the instantaneous center of rotation $I_R$ of support frame 106 is located at the intersection of lines extended from the longitudinal axes of flexure elements 112–114 and 113–115.

In one embodiment, four actuators 141–144 are employed to oscillate the support frame 106. These actuators may be, for example, "Lorenz force" actuators or any suitable voice coil type actuators. The type, number and placement of the actuators is not critical to the invention, and constitutes a design choice which is implementation-specific.

Objects to be supported by support frame 106 include a mirror, a laser or other light source, and any other object which requires oscillation about two orthogonal axes.

Because the flexure elements 112–115 function as spring hinges, no friction is encountered when the suspension is displaced or "pivoted". The resistance encountered in inducing rotatation of each flexure element provides a force which tends to cause the flexure element to return to its pre-rotated position. This characteristic together with the lack of rotational friction of the suspension allows the suspension system to achieve high pivotal frequencies while using a minimal amount of energy.

It is to be expressly understood that the claimed invention is not to be limited to the description of the preferred embodiment but encompasses other modifications and alterations within the scope and spirit of the inventive concept.

I claim:

1. A suspension system for supporting an object to be rotated about a desired point, said suspension system comprising:

(a) a support frame for supporting said object;

(b) a ground frame for providing a stationary reference structure;

(c) a coupling member interposed between said support frame and said ground frame;

(d) first rigid connecting means comprising a first pair of pivotable members, having revolute joints at each end thereof for flexibly connecting said coupling member to said support frame; and (e) second rigid connecting means comprising a second pair of pivotable members, aligned substantially at a right angle to said first rigid connecting means, and having revolute joints at each end thereof for flexibly connecting said coupling member to said ground frame;

wherein said first rigid connecting means and said second rigid connecting means are pivotal about said revolute joints to provide two perpendicular axes of rotation of said object while eliminating translational movement in all directions and also eliminating rotation about an axis normal to a plane defined by a perimeter of said support frame.

2. The system of claim 1, wherein said first pair of pivotable members and said second pair of said pivotable members each comprise a flat spring.

3. The system of claim 1, wherein said revolute joints comprise ends of said pivotable members which are thinner than the intermediate sections of the pivotable members.

4. The system of claim 1, wherein at least one actuator coupled to said support frame is used to oscillate said support frame.

5. The system of claim 1, wherein a first end of one said pivotable member in each said pair of pivotable members is attached to a side of said coupling member opposite from the other said pivotable member of said pair.

6. The system of claim 5, wherein a second end of each one of one said pair of said pivotable members is attached to said support frame and a second end of each one of the other said pair of said pivotable members is attached to said ground frame.

7. The system of claim 5, wherein said object supported by said suspension system rotates about a point defined by the intersection of lines drawn parallel to the longitudinal axes of said pivotable members.

8. A suspension system for rotatably positioning an object, said suspension system having two degrees of rotational freedom about a desired point, said suspension system comprising:

(a) a first four-bar linkage comprising a coupling plate, a support frame and a first pair of intermediate members connected between said coupling plate and said support frame;

said first pair of intermediate members having revolute joints at each end of each member of said pair for flexibly connecting said coupling plate to said support frame; and (b) a second four-bar linkage comprising said coupling plate, a ground frame and a second pair of intermediate members connected between said ground frame and said coupling plate;

said second pair of intermediate members being aligned substantially at a right angle to said first pair of intermediate members and having revolute joints at each end of each member of said second pair for flexibly connecting said coupling plate to said ground frame;

wherein said first pair of intermediate members and said second pair of intermediate members are pivotal about said revolute joints to provide two perpendicular axes of rotation of said object while eliminating translational movement in all directions and also eliminating rotation about an axis normal to a plane defined by a perimeter of said support frame.

9. The system of claim 8 wherein said revolute joints comprise ends of said intermediate members which are thinner than the intermediate sections of each of said intermediate members.

* * * * *